Dec. 22, 1931. C. S. MALLETT 1,837,975
ELECTRIC HEATER
Filed Nov. 29, 1926
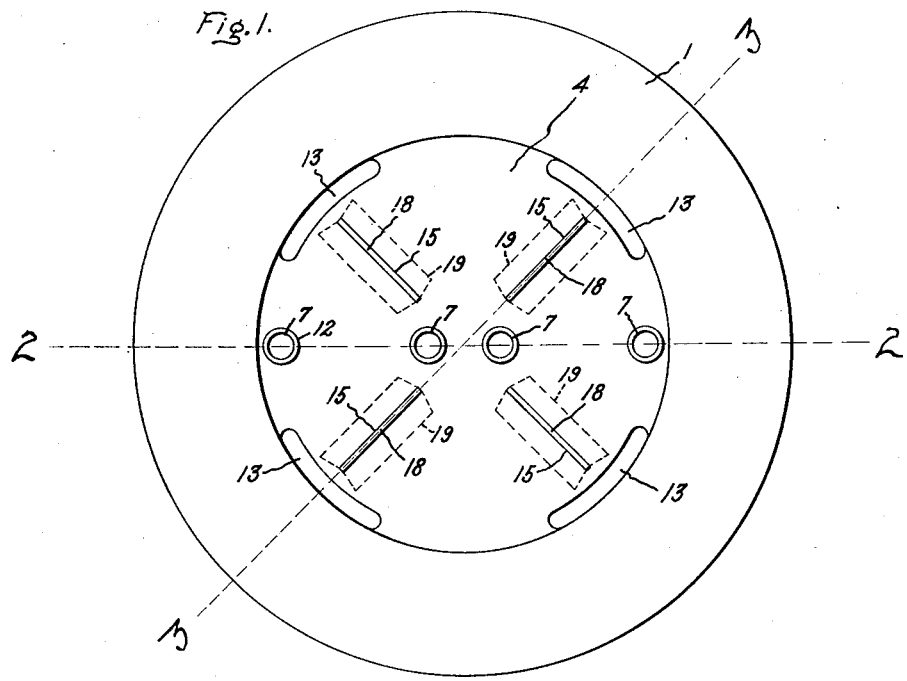
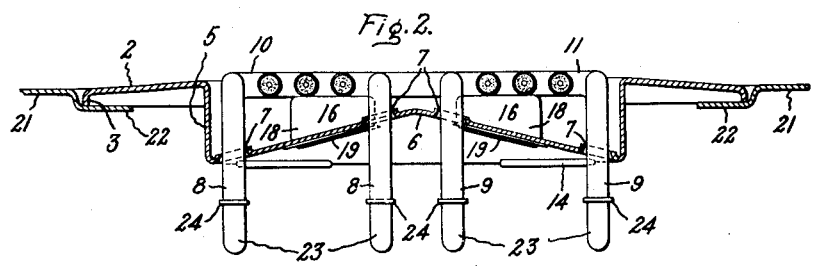
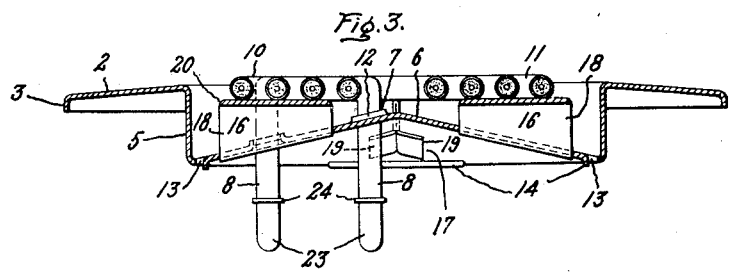
Inventor:
Charles S. Mallett,
by His Attorney.

Patented Dec. 22, 1931

1,837,975

UNITED STATES PATENT OFFICE

CHARLES S. MALLETT, OF TORONTO, ONTARIO, CANADA, ASSIGNOR TO GENERAL ELECTRIC COMPANY, A CORPORATION OF NEW YORK

ELECTRIC HEATER

Application filed November 29, 1926, Serial No. 151,382, and in Canada September 17, 1926.

My invention relates to electric heating devices and more particularly to a supporting device for a grid element of sheathed wire adapted to directly support articles to be heated.

A heating device of this general type is disclosed in a United States Patent No. 1,345,730, dated July 6, 1920, to C. C. Abbott. This patent describes a heating element composed of a metal sheath with a central heating wire therein spaced from the sheath by closely packed powdered insulation. The element is bent into the form of a grid and supported so that it directly supports the articles to be heated. Obviously this type of element presents many advantages, one of the most important of which is the high heating speed attained.

A copending application, Serial No. 151,-
381, filed in the name of Charles Stanley Mallett and G. W. Heinbuch and assigned to the same assignee as the present invention discloses an improved form of this type of heating device in which the sheathed wire grid is supported free for expansion and removal on a pan structure which in turn rests loosely on the stove structure, the projecting terminals of the grid passing freely through openings in the pan and being received and frictionally held by current input receiving contacts. The parts are thus so assembled that they may be readily removed for separate cleaning.

Certain difficulties are encountered in this construction. The pan which is below the element is subject to a high temperature and is alternately heated and cooled, the result being that it becomes dished downwardly or of irregular form in the hollows of which collect material spilled from cooking utensils supported on the grid. This material due to the proximity of the heating element becomes burned to the pan. In the case of grease being spilled and thus collecting there is the danger that it may become ignited and be a source of danger to the person attending. The burning of the grease will further warp the pan and render its condition worse.

It is the main object of my invention to provide a grid supporting pan that will overcome these objections, that will retain its shape under the variations of temperature, that will drain spilled material away from the terminals, that is readily cleaned, that is cheaply manufactured and that has grid supporting elements which cannot become displaced and wrongly assembled.

For a more complete understanding of my invention reference should be had to the accompanying drawings wherein the same reference characters refer to the same elements throughout the several views, and in which Fig. 1 is a top plan view of my grid supporting pan; Fig. 2 is a cross-sectional view thereof on the line 2—2 of Fig. 1 and also showing a heating element supported therein in operative position; Fig. 3 is a cross-sectional view on the line 3—3 of Fig. 1, and also showing a heating element in operative position. The pan member indicated as a whole by 1 is formed from a sheet metal blank. It has a main horizontally extending portion 2, with a downturned peripheral flange 3, and a depressed central portion 4. This depressed central portion forms a dish-shaped member having vertical walls 5 and a reentrant bottom 6 in the form of a cone with rounded apex. Openings 7 are provided in the bottom of pan for permitting the passage of the ends 8 and 9 of the grid members 10 and 11 therethrough. These openings are punched upwardly and have upturned edges 12. Further openings 13 are provided, four being shown, of substantial extent and are located at the base of the cone-shaped reentrant bottom. These openings 13 are punched downwardly and have their edge turned downwardly as indicated at 14, see Fig. 2.

Radially extending slots 15 of which four are shown, are provided in the bottom to accommodate grid supporting members 16. The members 16 are each preferably formed from a single folded piece of metal as best seen at 17, Fig. 3, and have an upstanding part 18 and two outstanding flanges 19. In Fig. 1 the flanges are shown in dotted lines lying against the bottom of the pan. As shown in Figs. 1 and 3 one end of the upstanding part 18 is wider than the other and the configuration is such that on being passed through the radial slots 15 from beneath, the flanges 19 will lie against the bottom and the top edge will extend horizontally and somewhat below the level of the portion 2 of the pan. When in this position the supports are secured by spot welding the flanges to the bottom of the pan. The corners 20 of the supports are rounded off.

The pan is designed to be supported by its flanges 3 on the top surface 21 of the heater, a portion of which is shown in Fig. 2 provided with a depressed seat 22 whereby when assembled the horizontally extending portion 2 is about the level of the top surface of the heater.

10 and 11 indicate a pair of sheathed wire heating elements coiled to form a utensil supporting grid and having downturned ends with rigid projecting terminals 23 insulated from the sheath by mica washers 24. As is clearly shown in Fig. 2 the downturned ends of the coils are passed through the openings 7 in the pan and the terminals are received and frictionally held by current input contacts, not shown. The downturned ends of the sheathed wire element are shown in full lines in the cross-sectional view Fig. 2. When thus assembled the coil holds the pan snugly in position and forms a grid supported by the members 16 with its upper surface at a slightly higher elevation than the horizontally extending part 2.

It will be seen that a pan is provided which has great rigidity and is one that will not be deformed by the successive heatings and coolings. The cone-shaped bottom itself imparts this desirable rigidity but this rigidity is enhanced by the supports 16 welded thereto which forms a truss-like structure. The members 16 may be secured in other ways than the exact structure shown, for example, they may be integral with the pan, being worked up from the metal thereof.

A pan is provided which may be readily cleaned, there being no projection where dirt may accumulate. The upturned edges of the openings provided for the passage of the sheathed wire tends to prevent spilled material running down the wire and fouling the contacts beneath. The conical shape of the bottom provides that spilled material will quickly pass to the bottom thereof where drainage openings of substantial size are provided. The downturned edges of the drainage openings assures ready drainage and do not obstruct the cleaning of the interior.

While I have described my invention in a specific manner as required by the patent statutes I desire it to be understood that I do not limit myself to the structure shown, as modifications may suggest themselves to those skilled in the art without departing from the spirit of my invention, the scope of which is set forth in the annexed claims.

What I claim as new and desire to secure by Letters Patent of the United States, is,—

1. A support for a heating grid comprising a plate provided with a depressed central portion having a reentrant bottom, said bottom being provided with openings near the periphery of said depressed portion, and with openings to receive the ends of said grid.

2. A support for a heating grid comprising a plate provided with a depressed central portion having a reentrant bottom, said bottom being provided with openings having upturned edges to receive the ends of the heating grid.

3. A support for a heating grid comprising a plate provided with a depressed central portion having a cone-shaped reentrant bottom, said bottom being provided with openings near the periphery of said depressed portion and with openings having upturned edges to receive the ends of said grid.

4. A support for a sheathed wire heating grid comprising a plate provided with a depressed central portion having a reentrant bottom and a plurality of radial supporting members for said grid secured to said bottom.

5. A support for a heating grid comprising a plate provided with a depressed central portion having a reentrant bottom, said bottom being provided with slots, and supporting members for said grid projecting through said slots and secured to said bottom.

6. A support for a heating grid comprising a plate provided with a depressed central portion having slots therein and supporting members for said grid extending through said slots, said supporting members being each formed of a single piece of metal folded on itself to provide outstanding flanges.

7. A support for a heating grid comprising a plate provided with a depressed central portion having a reentrant bottom, said bottom being provided with slots, and supporting members for said grid extending through said slots, said supporting members being provided with flanges engaging the under surface of said supporting members and welded thereto.

8. A support for a heating grid comprising a plate provided with a depressed central portion having a reentrant bottom and a plurality of radial members secured to said reentrant bottom so as to strengthen said support and thereby prevent deformation by successive heating and cooling and to provide a truss-like supporting structure for said heating grid.

9. A support for a heating grid comprising a plate provided with a depressed central portion having a reentrant bottom, said bottom being provided with openings near the periphery of said depressed portion, and with openings having upturned edges to receive the ends of said grid, and truss-like supporting means for said grid secured to said bottom.

10. A support for a heating grid comprising a plate provided with a depressed central portion having a reentrant bottom and members rigidly secured to said reentrant bottom and extending radially thereof so as to strengthen said support to prevent deformation by successive heating and cooling, said members being arranged to form supports for the grid.

In witness whereof, I have hereunto set my hand this 26th day of November, 1926.

CHARLES S. MALLETT.